United States Patent

[11] 3,631,583

[72] Inventor John Haller
Northville, Mich.
[21] Appl. No. 875,816
[22] Filed Nov. 12, 1969
[45] Patented Jan. 4, 1972
[73] Assignee Federal-Mogul Corporation
Southbridge, Mich.

[54] METHOD FOR PRODUCING SUBSTANTIALLY SOLID EXTRUSIONS FROM POWDERED METAL
10 Claims, 21 Drawing Figs.
[52] U.S. Cl. .................................................. 29/420.5,
29/423, 29/DIG. 31, 29/DIG. 47, 75/226, 264/111
[51] Int. Cl. .................................................. B22f 3/24
[50] Field of Search ........................................... 29/420,
420.5, 423, DIG. 31, DIG. 47; 264/111; 75/226

[56] References Cited
UNITED STATES PATENTS
3,340,056 9/1967 Cloran et al. ............... 75/226 X
2,123,416 7/1938 Graham ....................... 29/420
3,474,516 10/1969 Finlay et al. ................. 29/420.5 X
3,060,560 10/1962 Biehl et al. ................... 29/420.5

Primary Examiner—John F. Campbell
Assistant Examiner—D. C. Reiley
Attorney—Barthel & Bugbee ABSTRACT: Powdered metal is encased in an elongated flat-ended airtight deformable can by pouring it through a tubular filling stem through which the interior of the can is then evacuated to avoid subsequent oxidation of the contents thereof, and the stem is then sealed to retain the vacuum. The powdered-filled evacuated can is then heated to a high temperature of approximately 2,100° F. for about 1 hour, and while at that temperature is first compressed longitudinally to a high density in an extrusion containing a longitudinal extrusion chamber with a lateral extension thereof which causes it to undergo extrusion laterally into said lateral extension of the extrusion chamber located within the die cavity. This action kneads the densified metal and obtains a so-called "grain flow" which improves the metallurgical properties thereof. Meanwhile, the peripheral portions of the opposite ends of the can move into clearance spaces surrounding the ends of one or both of the punches, thereby preventing crinkling of the can. The walls of this dense metal-filled can are then removed by machining or pickling, along with the deformed peripheral end portions thereof containing less dense metal powder. Thus, there is produced a substantially solid, laterally extended metal billet, the shape of which can be varied in accordance with the variation of the shape of the lateral extension of the extrusion chamber within the die cavity, for example circular (FIGS. 6 and 7), rectangular (FIG. 14), cruciform (FIG. 15) or circular with a central boss or bosses (FIGS. 20 and 21).

PATENTED JAN 4 1972

INVENTOR
JOHN HALLER
BY Barthel & Bugbee
ATTORNEYS

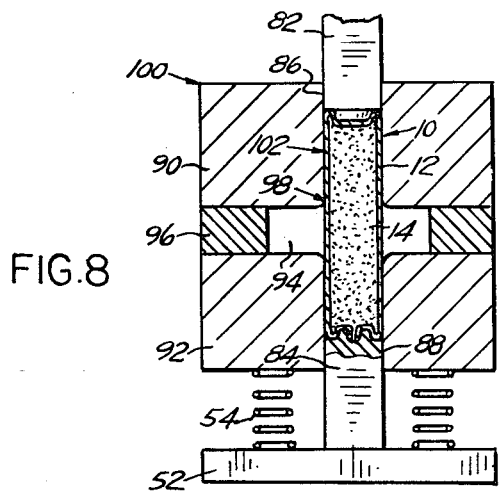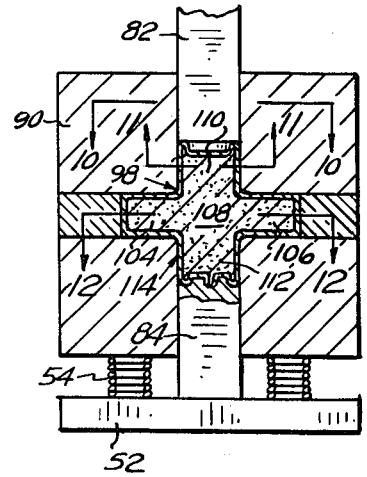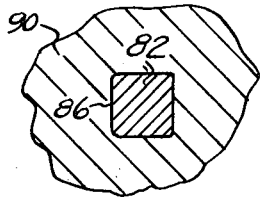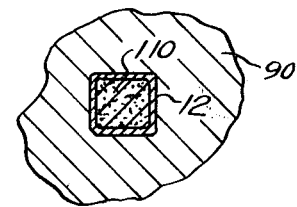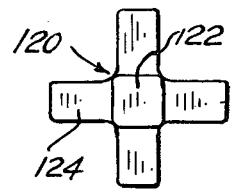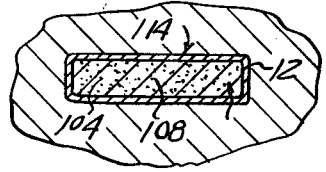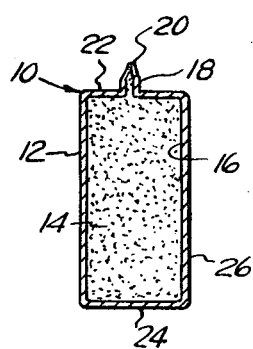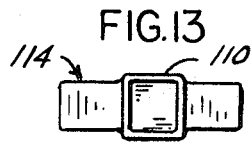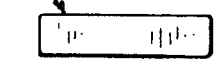

INVENTOR
JOHN HALLER
BY Barthel & Bugbee
ATTORNEYS

METHOD FOR PRODUCING SUBSTANTIALLY SOLID EXTRUSIONS FROM POWDERED METAL

BACKGROUND OF THE INVENTION

In my copending applications Ser. No. 779,151, filed Nov. 26, 1968, and Ser. No. 832,576, filed June 12, 1969, there are disclosed methods of highly densifying powdered metal and of producing elongated highly densified powdered metal articles respectively. In these methods, a cylindrical can is filled with metal powder, evacuated, sealed, heated to approximately 2,100° F. and compressed to approximately 100 percent density. During such compression, the can is prevented from crinkling by permitting its peripheral portion to deform axially into clearance spaces around one or both of the die punches. These methods as well as the present method are especially valuable for producing metal billets from so-called superalloy powders composed largely of cobalt or nickel to impart corrosion resistance and minimum deformation, yet with retained tensile strength at higher temperatures than ordinary metals or metal alloys possess. The method of the present invention imparts additional superior qualities because of the lateral extrusion accompanying the longitudinal or axial compression and densification of the metal powder, resulting from the additional working or kneading of the metal which occurs therein. These billets possess improved and more uniform metallurgical characteristics than the previously cast exotic metal alloys of this type and keep waste of the metal at a minimum.

In the drawings,

FIG. 5 is a central longitudinal section through the powder-filled evacuated can prior to its compression and lateral extrusion as shown in FIGS. 1 to 4 inclusive;

FIG. 8 is a view similar to FIG. 1 but showing the die set after the start of the compression, in the extrusion chamber therein of a heated evacuated deformable can of rectangular cross section containing powdered metal;

FIG. 9 is a view similar to FIG. 8 at the conclusion of the longitudinal compression and lateral extrusion of the hot powder-filled can;

Figure 16:
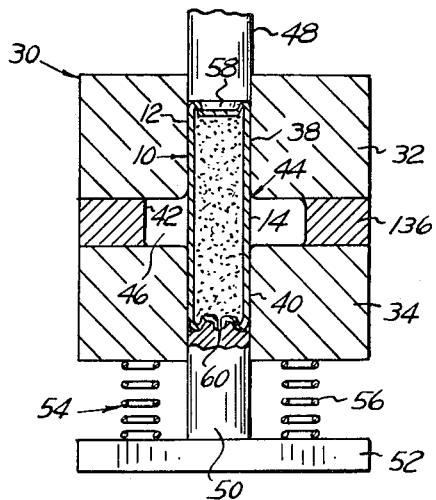
Figure 17:
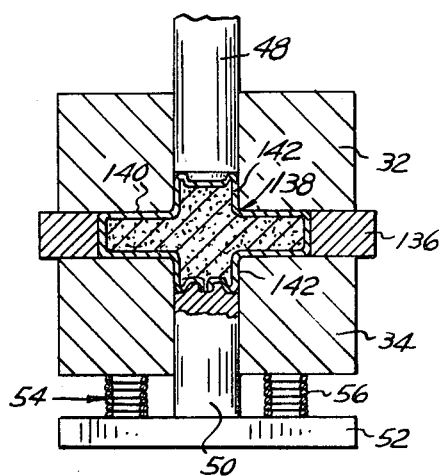
Figure 20:
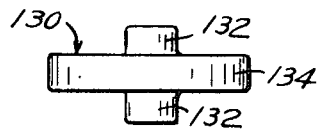
Figure 18:
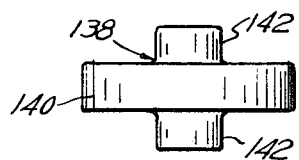
Figure 19:
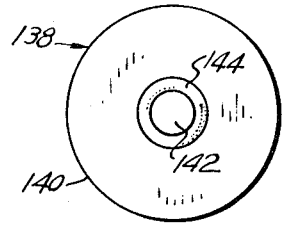
Figure 21:
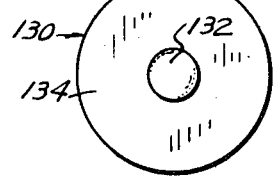

FIGS. 10, 11 and 12 are fragmentary cross sections taken along the lines 10—10, 11—11 and 12—12 in FIG. 9;

FIG. 13 is a top plan view of the longitudinally deformed and laterally extruded workpiece shown in FIGS. 9 to 12 inclusive after its removal from the extrusion chamber of the die set;

FIG. 14 is a top plan view of the metal alloy billet of FIG. 13 after removal of the container therefrom;

FIG. 15 is a top plan view of a modification of the workpiece shown in FIG. 14 produced in a manner similar to that shown in FIGS. 9 to 12 inclusive but employing a cruciform lateral extrusion chamber extension resulting in a cruciform workpiece;

FIG. 16 is a central vertical section through a die set used in a further modification of the invention shortly after the start of the compression of an elongated heated evacuated deformable can of circular cross section containing powdered metal alloy;

FIG. 17 is a view similar to FIG. 16 after the longitudinal compression and lateral extrusion of the hot powder-filled can have been completed and the sidewall member of the lateral cavity containing the extrusion chamber of the die set has been stretched during the method, the amount of stretching being exaggerated for the sake of clarity;

FIG. 18 is a side elevation of the workpiece after its removal from the extrusions chamber in the die cavity of FIG. 17;

FIG. 19 is a top plan view of the workpiece shown in FIG. 18;

FIG. 20 is a side elevation of the metal alloy billet of FIG. 18 after removal of the container therefrom; and FIG. 21 is a top plan view of the billet shown in FIG. 20.

Referring to the drawings in detail, FIG. 5 shows a powder-filled, sealed and evacuated container unit, generally designated 10, as consisting of an elongated metal container 12, preferably of stainless steel, which has been filled with a charge 14 of metal or metal alloy powder which is to be compacted to an extremely high density approaching or equaling solidity or 100 percent density and subjected to lateral extrusion. The powder charge 14 has been previously inserted in the interior chamber 16 of the container 12 through a tubular filling and evacuating stem 18, the tip 20 of which after evacuation of the chamber 16 has been pinched and sealed as by welding in order to maintain the high vacuum in the chamber 16. The container 12 has substantially flat end walls 22 and 24 and, in this form of the invention, a substantially cylindrical sidewall 26.

The extrusion die set, generally designated 30, within which the powder-filled container unit 10 is compacted and laterally extruded, consists of upper and lower die members 32 and 34 respectively disposed in spaced-parallel relationship and separated from one another by a centrally apertured spacer member 36 and collectively forming a composite die, generally designated 35. The die members 32 and 34 are provided with aligned upper and lower die bores or longitudinal die cavity portions 38 and 40 respectively meeting the enlarged central or intermediate bore 42 within the spacer member 36 at a restricted entrance opening 45 therebetween. The bores 38, 40 and 42 collectively constitute a die cavity which contains an extrusion chamber, generally designated 44, of which the major part consists of the enlarged intermediate chamber 46 formed between the upper and lower die members 32 and 34 and the intermediate die bore 42. Mounted for relative sliding motion in their respective upper and lower die bores 38 and 40 are upper and lower punches 48 and 50 respectively. The upper punch 48 is connected to the upper platen of a suitable conventional compacting press (not shown) for upward and downward motion out of and into the upper die bore 38. The lower punch 50, on the other hand, is fixedly mounted on a supporting member 52 which in turn is mounted upon and secured to the bed or bolster (not shown) of the conventional hydraulic or mechanical compacting press (also not shown).

Figure 1:
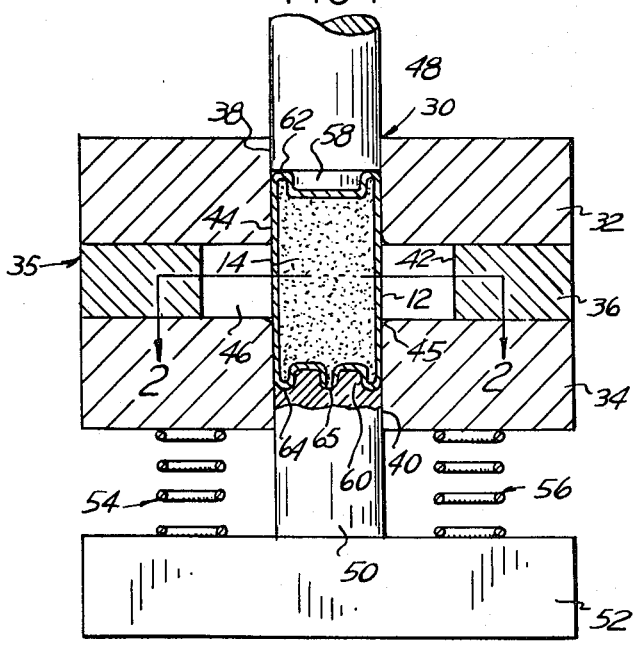
FIG. 1 is a central longitudinal section through an extrusion die set shortly after the start of the compression of a heated evacuated deformable can of circular cross section containing powdered metal, as shown in FIG. 5.
Figure 2:
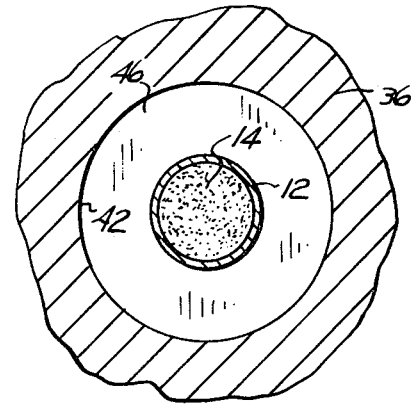
FIG. 2 is a fragmentary cross section taken along the line 2—2 in FIG. 1.

The composite die 35 is preferably yieldingly mounted on and supported by a conventional die cushion, generally designated 54, consisting either of the compression spring 56 shown in FIG. 1 or of a conventional hydraulic die cushion (not shown). Either of these cushions is well known in the press art and their details are beyond the scope of the present invention. The lower punch 50 and its supporting member 52 are preferably connected to a lower press plunger or platen (not shown) which is stationary during the pressing operation but which is movable upward thereafter to eject the finished workpiece from the extrusion chamber 44 in a manner well known to the press art. The upper die member 32 is also movable upward away from the intermediate and lower die members 36 and 34 by conventional means (not shown) in order to eject the laterally extruded workpiece from the intermediate die bore 42 and the lower die bore 40 containing the lower portions of the extrusion chamber 44. The upper and lower punches 48 and 50 are provided with central nose portions 58 and 60 respectively projecting therebeyond and of smaller diameter than their respective punches 48 and 50 so as to provide upper and lower clearance spaces 62 and 64 extending therearound. The upper end portion of the lower punch 50 is provided with a central recess 66 adapted to receive the sealed stem 18 of the container 12.

In carrying out the method of the invention by the use of the extrusion die set 30 shown in FIGS. 1 to 4 inclusive, the container 12, made in a shape adapted to conveniently fit the die bores 38 and 40, is placed in the upright position shown in FIG. 5 and is then filled through the stem 18 with the charge 14 of powdered metal, which as previously stated, may be of the so-called superalloy type containing cobalt or nickel for resisting deformation and corrosion at high temperatures while retaining high tensile strength. After the container chamber 16 has been completely filled with the powdered metal charge 14 through the stem 18, the latter is connected to a high vacuum pump (not shown) and the chamber 16 evacuated as completely as is commercially practical and possible in order to prevent subsequent oxidation of the particles of metal powder or metal alloy powder in the change 14 at the high temperature to which the latter is subsequently subjected. While the container chamber 16 is still maintained in a highly evacuated state, the stem 18 is sealed off, as by pinching and welding, so as to produce the pinched, sealed airtight can 20.

The sealed and evacuated powder-filled container unit 10 is then placed in a suitable furnace or otherwise heated, as by electrical induction, to a temperature of approximately 2,100° F. for approximately 1 hour, and then inverted and immediately transferred to the extrusion chamber 44 with the stem 18 projecting downward into the recess 66 in the nose portion 60 of the lower punch 50. The upper punch 48 is now caused to descend into the upper die bore 38 while the lower punch 50 is temporarily held stationary by the springs 56, whereupon the nose portion 58 of the upper punch 48 engages the bottom wall 24 of the inverted container 12 and pushes it downward, thereby starting to compress the powder-filled evacuated sealed container assembly 10. As this hot compacting operation proceeds, the substantially flat bottom and top walls 24 and 22 of the container 12 are deformed into the shape shown in FIG. 1 with their peripheral portions extending into the peripheral clearance spaces 62 and 64.

As the upper plunger 48 continues to descend and the density of the powdered metal charge 14 approaches solidity or 100 percent density, the sidewall 26 of the container 12 is deformed laterally outward through the entrance opening 45 into the intermediate chamber 46 of the extrusion chamber 44. Meanwhile, the powdered metal particles have become fused together as the result of the high temperature and pressure applied. At the same time, the highly heated and fused metal alloy in the intermediate portion of the charge 14 has been extruded laterally outward through the entrance opening 45 into the intermediate chamber 46, whereupon the moving parts assume the relative positions shown in FIG. 3. The above-described high compression and lateral extrusion bring about a working or kneading of the metal so as to improve its metallurgical characteristics greatly. The result of the foregoing method is the production of the pancake-shaped encased metal billet, generally designated 70, shown in FIG. 3 and in cross section in FIG. 4. The encased billet 70 is then removed form the die cavity 44 by retracting the upper punch 48 and upper die member 32 upward and moving the lower punch 50 upward upon an ejection stroke.

Figure 7:
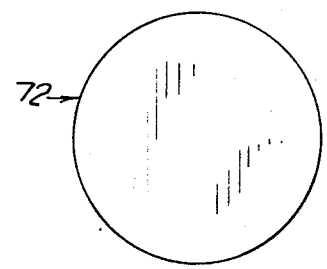
FIG. 7 is a top plan view of the billet shown in FIG. 6.
Figure 6:
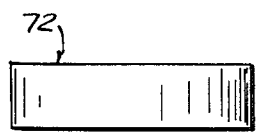
FIG. 6 is a side elevation of the metal alloy billet after removal of the container therefrom.

The container 12 is now removed and separated from the therein-contained solidified and extruded metal billet 72 by machining, pickling or other suitable means, and the ridges 74 containing less dense metal alloy material are also machined off or otherwise removed. The result is the circular substantially solid metal alloy billet shown in FIGS. 6 and 7 with a density near or at 100 percent. If the container 12 has been formed from ordinary steel, it can be peeled off the solidified or compacted metal alloy billet 72 in a simple and inexpensive manner as compared with removing it with machining or pickling. The temperatures and times at which the powder-filled container unit 10 is heated will vary with the size of the billet to be produced. The range of temperatures from 2,000° F. to 2,2000° F. has been found satisfactory for the range of billet sizes ordinarily produced, whereas the above-mentioned period of 1 hour for heating is necessarily increased as the size and weight of the billet 72 to be produced are also increased.

The mounted metal alloy billet, generally designated 80, of rectangular block shape, shown in FIG. 14 is produced in a manner similar to that described above in producing the circular billet 72 except that the shapes of the upper and lower punches 82 and 84 respectively and their die bores 86 and 88 respectively in the upper and lower die members 90 and 92 respectively are of square or rectangular cross section as is also the cross section of the lateral extension 94 in the spacer 96 of the extrusion chamber collectively designated 98 within the die cavity. The remaining parts of the extrusion die set 100 are generally similar to those of the die set 30 of FIGS. 1 and 3, hence corresponding parts are similarly designated with reference numerals. As described in connection with FIGS. 1 to 7 inclusive, a powder-filled sealed and evacuated container unit 102 is again prepared (FIG. 5) but in this instance of square or rectangular cross section corresponding to the cross section of the upper and lower die bores 86 and 88 (FIG. 10).

As before, the powder-filled container unit 102 is heated to a temperature of approximately 2,100° F. for a suitable period, such as 1 hour, and immediately transferred to the extrusion chamber 98 and compacted as before. During the compression stroke of the upper punch 82, the densification of the powder charge 14 occurs as before and the midportion thereof extrudes into the cavity extension 94. Here, however, it maintains its rectangular cross section and assumes a rectangular block configuration (FIGS. 9 and 12) with arms 104 and 106 extending from a central portion 108 outward, and with upper and lower projecting portions 110 and 112 respectively remaining in the upper and lower die bores 86 and 88 respectively (FIG. 9).

As a result of this action, the peripheries of the opposite ends of the container 12 deform into the clearance spaces around the peripheries of the upper and lower punches 82 and 84. The upper punch 82 and upper die member 90 are then retracted upward as before, and the lower punch 84 moved upward upon an ejection stroke to eject the generally rectangular encased metal billet, generally designated 114, form the extrusion chamber 98. The deformed container 12 is now removed and separated from the solidified and extruded metal billet 116 in the above-described manner, together with the projections 110 and 112, leaving the rectangular block-shaped metal billet 80 (FIG. 14).

The further modified metal alloy billet, generally designated 120, shown in FIG. 15, is produced in a manner similar to the metal alloy billet 80 of FIG. 14 in a similar die wherein the die cavity extension is of cruciform shape with four arms instead of two as in the case of the die cavity 94 of FIG. 8. An evacuated powder-filled container unit 10 is again used and, as in FIG. 8, of rectangular cross section. Compression and densification with consequent extrusion into the lateral die cavity extensions produces a cruciform workpiece which, when the container unit is removed in the above-described manner, leaves oppositely projecting central portions 122 (only one of which is shown in FIG. 15) with arms 124 projecting therefrom at right angles. If the projections 122 are not desired, they may, of course, be machined off.

Figure 3:
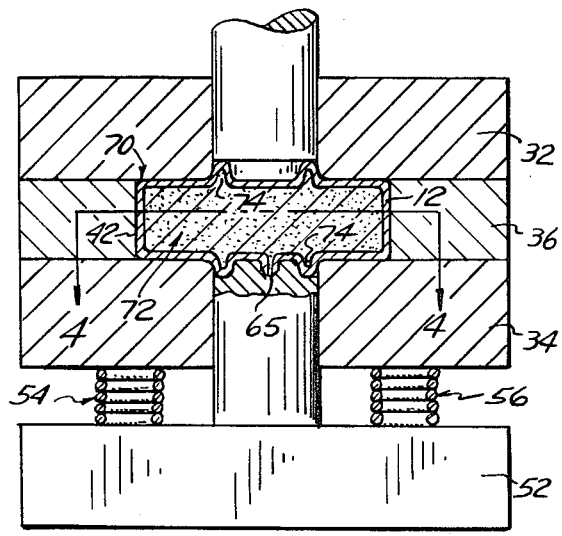
FIG. 3 is a view similar to FIG. 1 after longitudinal compression and lateral extrusion of the hot powder-filled can have been completed.
Figure 4:
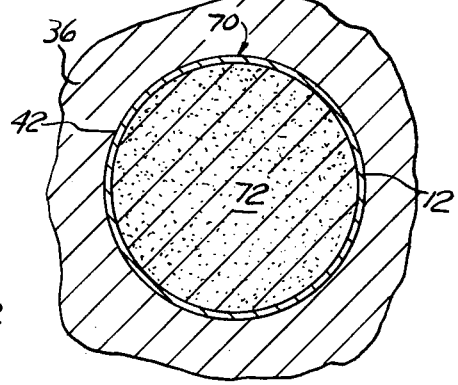
FIG. 4 is a fragmentary cross section taken along the line 4—4 in FIG. 3.

The still further modified metal alloy billet, generally designated 130, shown in FIGS. 20 and 21 is again produced by a die set 30 similar to that shown in FIGS. 1 and 3 but with the upper and lower die bores 38 and 40 somewhat longer in order to produce the hubs or bosses 132 which project in either or both directions from the center of the circular or shallow cylindrical body 134. The spacer 136 in this modification, however, is optionally made expansible so as to move outward as compression proceeds, as shown by the contrasting positions thereof in FIGS. 16 and 17. The powder-filled evacuated container unit 10 is also somewhat longer than in FIG. 5 in order to provide the greater amount of metal necessary for producing the hubs or bosses 132. The heating, compression, densification and consequent deformation of the unit 10 and its powdered metal alloy charge 14 take place as in FIGS. 1 to 7 inclusive with extrusion of the central portion laterally into the annular die cavity extension 46, except that if an expansible spacer 136 is used, it expands radially (FIG. 17).

The compression is halted when the lateral die cavity extension or intermediate chamber 46 of the extrusion chamber 44 becomes filled with the deformed container 12 and the powdered metal alloy charge 14 therein, and the density of the latter approaches solidity or 100 percent. This leaves an encased billet 138 consisting of a cylindrical midportion 140 and oppositely extending central projecting portions 142 (FIGS. 17, 18 and 19). Annular ribs 144 are also formed as a result of the deformation of the opposite ends of the powder-filled container unit 10 by the nose portions 58 and 60 of the upper and lower punches 48 and 50. Following ejection of the encased billet 138 and the removal of its deformed container shell in the manner described in connection with FIGS. 1 to 7 inclusive, the metal alloy billet 130 with the oppositely projecting hubs 132 emerges.

It will be evident to those skilled in this art that the time periods and temperatures given in the examples set forth above are purely illustrative and that these may vary with different alloys having higher or lower melting points and with different sizes of billets to be produced.

What I claim is:

1. A method of producing a substantially solid extrusion from powdered metal, said method comprising
   encasing a charge of powdered metal in an elongated deformable airtight metal container,
   evacuating the powder-filled container,
   sealing the thus-evacuated powder-filled container,
   heating the sealed powder-filled container to a temperature and for a period of time sufficient to facilitate subsequent pressurized deformation of said container and densification and extrusion of the contents thereof,
   placing said heated, sealed airtight powder-filled container in an elongated extrusion chamber having an elongated longitudinal portion with a lateral enlargement therein,
   applying sufficient axial compressive force to at least one end of said heated, evacuated, powder-filled container while in said longitudinal portion of said extrusion chamber to deform said container axially and to densify and coalesce the powdered metal therein,
   continuing to apply said axial compressive force to said heated, evacuated, powder-filled container sufficiently to substantially solidify the densified powdered metal therein and to deform an intermediate portion between the opposite ends thereof laterally and extrude said intermediate portion thereof laterally as a container-covered metal billet into said lateral enlargement of said extrusion chamber,
   terminating the application of said compressive force,
   ejecting the laterally deformed container and the billet therein from the extrusion chamber, and removing the container metal from the billet.

2. A method, according to claim 1, wherein the heating of the container and its contents is carried out to a temperature of approximately 2,100° F. for approximately 1 hour prior to applying said axial compressive force thereto.

3. A method, according to claim 1, including the step of halting the lateral deformation of said intermediate portion of said container and billet at a predetermined lateral distance from said longitudinal portion of said extrusion chamber.

4. A method, according to claim 3, including the step of yieldingly halting the lateral deformation of said container and billet.

5. A method, according to claim 1, wherein said lateral deformation of said powder-filled container is carried out substantially entirely therearound.

6. A method, according to claim 1, including deforming said heated, evacuated, powder-filled container laterally and extruding said container and the contents thereof through a restricted lateral extrusion opening in said extrusion chamber disposed between said longitudinal portion of said extrusion chamber and the lateral enlargement thereof.

7. A method, according to claim 1, including terminating the application of said compressive force while an end portion of said container and its contents is retained within said longitudinal portion of said extrusion chamber.

8. A method, according to claim 1, including the step of restricting the directions of lateral deformation and extrusion to predetermined paths extending outward from said longitudinal portion and at the same time preventing said lateral deformation and extrusion in lateral directions other than along said predetermined laterally extending paths.

9. A method, according to claim 1, including permitting the peripheral portion of at least one end of said container and its contents to extrude longitudinally in said longitudinal portion of said extrusion chamber in the opposite direction from the direction of application of said compressive force while confining the application of said compressive force to the central part of said end.

10. A method, according to claim 9, including the step of removing the longitudinally extruded peripheral portion of said one end of said container and the portion of the billet therein subsequent to the ejection of said container and billet therein from said extrusion chamber.

* * * * *